(12) United States Patent
Emi et al.

(10) Patent No.: US 7,281,369 B2
(45) Date of Patent: Oct. 16, 2007

(54) DETERIORATION DIAGNOSIS OF DIESEL PARTICULATE FILTER

(75) Inventors: Masahiko Emi, Yokosuka (JP); Manabu Miura, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 78 days.

(21) Appl. No.: 11/063,869

(22) Filed: Feb. 24, 2005

(65) Prior Publication Data

US 2005/0188681 A1 Sep. 1, 2005

(30) Foreign Application Priority Data

Feb. 27, 2004 (JP) ............... 2004-053426

(51) Int. Cl.
*F01N 3/00* (2006.01)
*F01N 3/10* (2006.01)

(52) U.S. Cl. ............... 60/297; 60/277; 60/311

(58) Field of Classification Search ............ 60/297, 60/311
See application file for complete search history.

(56) References Cited

U.S. PATENT DOCUMENTS

| | | | |
|---|---|---|---|
| 5,154,055 A * | 10/1992 | Nakane et al. ............... | 60/276 |
| 5,771,685 A * | 6/1998 | Hepburn ............... | 60/274 |
| 6,167,696 B1 * | 1/2001 | Maaseidvaag et al. ........ | 60/274 |
| 6,446,429 B2 * | 9/2002 | Kobayashi et al. ........... | 60/285 |
| 6,470,674 B1 * | 10/2002 | Yamaguchi et al. .......... | 60/277 |
| 6,598,387 B2 * | 7/2003 | Carberry et al. ............. | 60/297 |
| 6,634,170 B2 * | 10/2003 | Hiranuma et al. ........... | 60/295 |
| 6,655,132 B2 * | 12/2003 | Bouchez et al. .............. | 60/295 |
| 6,722,120 B2 * | 4/2004 | Plote ........................... | 60/276 |
| 6,829,889 B2 * | 12/2004 | Saito et al. ................... | 60/291 |
| 6,988,361 B2 * | 1/2006 | van Nieuwstadt et al. .... | 60/295 |

FOREIGN PATENT DOCUMENTS

| JP | 5-240026 | 9/1993 |
|---|---|---|
| JP | 2002-339730 A | 11/2002 |

OTHER PUBLICATIONS

U.S. Appl. No. 11/063,181, filed Feb. 23, 2005, Ueda et al.

* cited by examiner

*Primary Examiner*—Thomas Denion
*Assistant Examiner*—Loren Edwards
(74) *Attorney, Agent, or Firm*—Foley & Lardner LLP

(57) ABSTRACT

A filter (14) traps particulate matter contained in the exhaust gas of a diesel engine (1). The filter (14) is regenerated by burning the trapped particulate matter through an operation to raise the exhaust gas temperature. An oxidation catalyst which promotes combustion of the particulate matter is coated onto the filter (14). The oxygen concentration of the exhaust gas upstream of the filter (14) and the oxygen concentration of the exhaust gas downstream of the filter (14) during the regeneration period are detected using universal exhaust gas oxygen sensors (17, 16). A controller (25) determines a substantial regeneration period on the basis of the difference between these oxygen concentrations, and by comparing a maximum value of the difference between the oxygen concentrations during the substantial regeneration period with a predetermined threshold, determines deterioration of the filter (14) with a high degree of precision.

14 Claims, 12 Drawing Sheets

4 INTER COOLER
16, 17 UNIVERSAL EXHAUST GAS OXYGEN SENSOR
20 ROTATION SPEED SENSOR
21 ACCELERATOR PEDAL DEPRESSION SENSOR
23 DPF TEMPERATURE SENSOR

4 INTER COOLER
16, 17 UNIVERSAL EXHAUST GAS OXYGEN SENSOR
20 ROTATION SPEED SENSOR
21 ACCELERATOR PEDAL DEPRESSION SENSOR
23 DPF TEMPERATURE SENSOR

US 7,281,369 B2

DETERIORATION DIAGNOSIS OF DIESEL PARTICULATE FILTER

FIELD OF THE INVENTION

This invention relates to the diagnosis of deterioration of a particulate filter which traps particulate matter contained in the exhaust gas of a diesel engine.

BACKGROUND OF THE INVENTION

A diesel particulate filter (DPF) attached to an exhaust pipe for removing particulate matter from the exhaust gas of a diesel engine heats and burns the particulate matter when the trapped particulate matter amount reaches a predetermined amount. This process is known as DPF regeneration.

Tokkai Hei 5-240026, published by the Japan Patent Office in 1993, teaches that the need for regeneration of a DPF is determined according to a differential pressure between the exhaust gas pressure upstream of the DPF and the exhaust gas pressure downstream of the DPF.

SUMMARY OF THE INVENTION

During DPF regeneration, oxygen in the exhaust gas is consumed by combustion of the particulate matter, leading to a difference between the oxygen concentration of the exhaust gas upstream of the DPF and the oxygen concentration of the exhaust gas downstream of the DPF. The inventors discovered, as a result of various experiments performed in relation to variation in the oxygen concentration of the exhaust gas during DPF regeneration, that the variation pattern of the oxygen concentration downstream of the DPF during regeneration differs according to the degree of deterioration in the DPF.

It is therefore an object of this invention to determine deterioration of a DPF with a high degree of precision on the basis of variation in the oxygen concentration of exhaust gas.

In order to achieve the above object, this invention provides a deterioration diagnosing device for use with a particulate filter which is interposed on an exhaust passage of an internal combustion engine to trap a particulate matter contained in an exhaust gas. The filter comprises an oxidation catalyst which promotes oxidation of the particulate matter so that the filter is regenerated using the oxidation catalyst by burning the trapped particulate matter in a high-temperature atmosphere The deterioration diagnosing device comprises a first sensor which detects an oxygen concentration of the exhaust gas in the exhaust passage upstream of the filter as a first concentration, a second sensor which detects an oxygen concentration of the exhaust gas in the exhaust passage downstream of the filter as a second concentration, and a programmable controller programmed to determine whether or not the filter has deteriorated on the basis of a difference between the first concentration and the second concentration.

This invention also provides a deterioration diagnosing method for the above particulate filter. The method comprises detecting an oxygen concentration of the exhaust gas in the exhaust passage upstream of the filter as a first concentration, detecting an oxygen concentration of the exhaust gas in the exhaust passage downstream of the filter as a second concentration, and determining whether or not the filter has deteriorated on the basis of a difference between the first concentration and the second concentration.

The details as well as other features and advantages of this invention are set forth in the remainder of the specification and are shown in the accompanying drawings.

DESCRIPTION OF THE PREFERRED EMBODIMENTS

Figure 1:
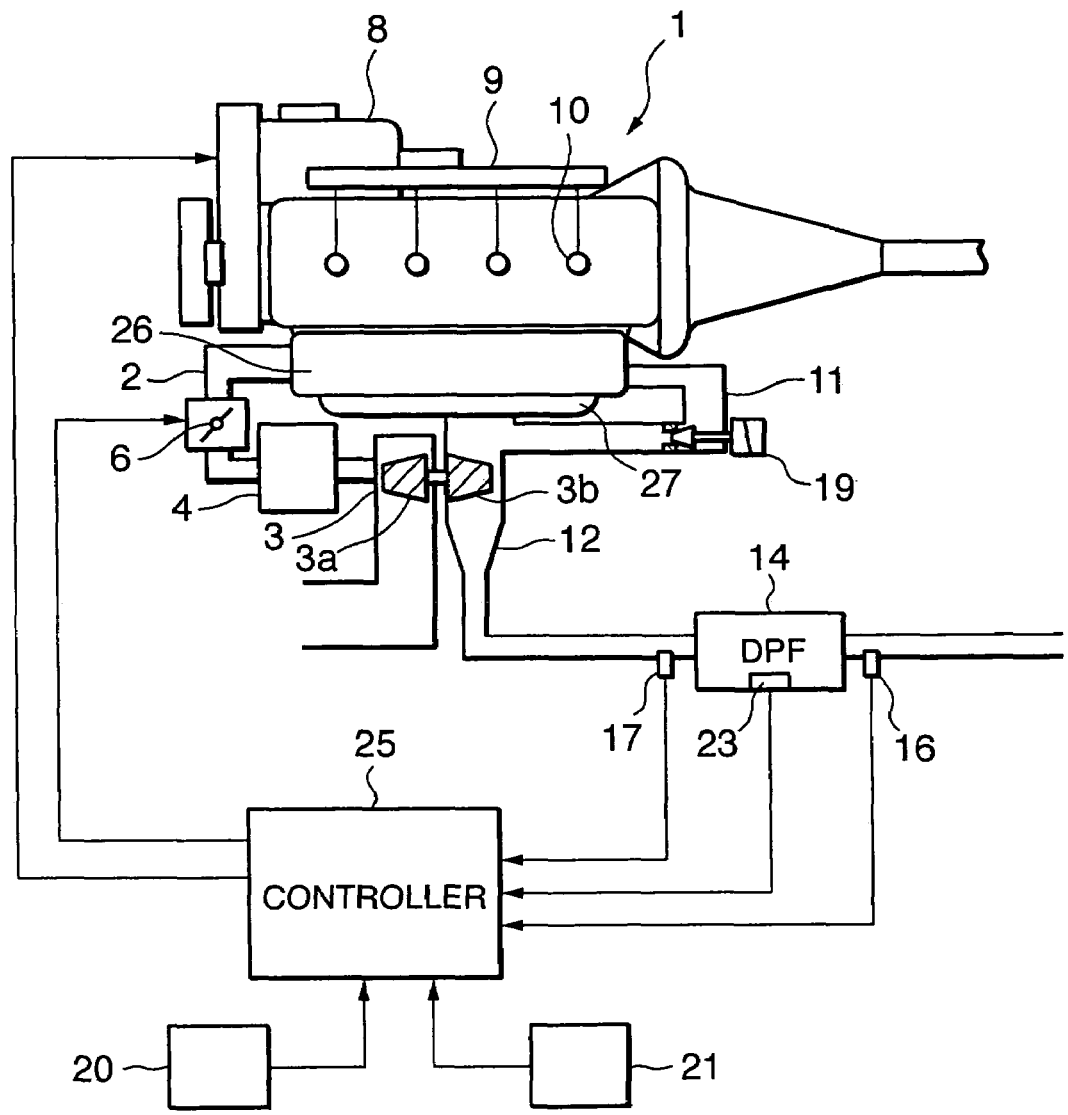
FIG. 1 is a schematic diagram of a vehicle diesel engine equipped with a DPF deterioration diagnosing device according to this invention.

Referring to FIG. 1 of the drawings, a multi-cylinder diesel engine 1 for use in a vehicle aspirates air from an intake passage 2 via a throttle 6 and an intake manifold 22. A compressor 3A of a turbocharger 3 which pressurizes the intake air, and an inter cooler 4 which cools the high-temperature intake air, are provided upstream of a throttle 6 on the intake passage 2.

The engine 1 comprises in each cylinder a fuel injector 10 which injects fuel into the air supplied to each cylinder from the intake manifold 22. Fuel is supplied to each fuel injector 10 from a common rail 9. The fuel is stored in a fuel tank provided in the vehicle, and a fuel pump 8 pressurizes the stored fuel in the fuel tank to a predetermined pressure in order to supply the fuel to the common rail 9.

The fuel mixes with the intake air to form an air-fuel mixture. The air-fuel mixture is burned by compression ignition within each cylinder of the engine 1 such that a piston is pushed down, and then discharged as an exhaust gas through an exhaust passage 12 into the air from an exhaust manifold 27.

A part of the exhaust gas in the exhaust passage 12 is recirculated to the intake manifold 22 through an exhaust gas recirculation passage (EGR passage) 11. The EGR passage 11 comprises a diaphragm-type EGR valve 19 which regulates the exhaust gas recirculation amount.

An exhaust turbine 3B of the turbocharger 3 is provided in the exhaust passage 12. The exhaust turbine 3B is mounted on a rotary shaft that is shared with the compressor 3A, and thus the exhaust energy in the exhaust passage 12 is used to supercharge the intake air in the intake passage 2.

A diesel particulate filter (DPF) 14 is provided downstream of the exhaust turbine 3B in the exhaust passage 12. The DPF 14 is constituted by a ceramic porous filter with an oxidation catalyst coated onto its surface. The oxidation catalyst serves to promote combustion of the particulate matter.

As described above, when the trapped particulate matter amount in the DPF 14 reaches an upper limit, the DPF 14 must be regenerated by heating the particulate matter.

As disclosed in the aforementioned Tokkai Hei 5-240026, the need to regenerate a DPF may be determined from the pressure differential upstream and downstream of the DPF. Heating of the particulate matter is realized by raising the exhaust gas temperature. Tokkai 2002-339730, published by the Japan Patent Office in 2002, discloses a method of raising the exhaust gas temperature by enriching the air-fuel ratio of the air-fuel mixture through such means as increasing the fuel injection amount of a fuel injector or narrowing the opening of a throttle.

In this embodiment, these conventional techniques are applied to the determination as to whether or not regeneration of the DPF 14 is required, and to the regeneration operation of the DPF 14. It should be noted, however, that any other method may be used to determine whether or not regeneration of the DPF 14 is required, and to perform a regeneration operation on the DPF 14.

This embodiment comprises a controller 25 for determining whether or not regeneration of the DPF 14 is required, performing a regeneration operation on the DPF 14, and diagnosing deterioration of the DPF 14. Here, deterioration of the DPF 14 signifies deterioration of the oxidation catalyst.

The controller 25 is constituted by a microcomputer comprising a central processing unit (CPU), read-only memory (ROM), random access memory (RAM), and an input/output interface (I/O interface). The controller may be constituted by a plurality of microcomputers.

To perform the control described above, a universal exhaust gas oxygen sensor 17 which detects the oxygen concentration of the exhaust gas is provided on the upstream side of the DPF 14 in the exhaust passage 12. A similar universal exhaust gas oxygen sensor 16 is provided on the downstream side of the DPF 14 in the exhaust passage 12. The universal exhaust gas oxygen sensors are well-known sensors which detect the oxygen concentration of exhaust gas in a wide range, from values corresponding to a rich air-fuel ratio to values corresponding to a lean air-fuel ratio.

It should be noted that the universal exhaust gas oxygen sensor 17 corresponds to a claimed first sensor, and the universal exhaust gas oxygen sensor 16 corresponds to a claimed second sensor. The oxygen concentration detected by the universal exhaust gas oxygen sensor 17 corresponds to a claimed first concentration, and the oxygen concentration detected by the universal exhaust gas oxygen sensor 16 corresponds to a claimed second concentration.

A rotation speed sensor 20 which detects a rotation speed of the engine 1, and an accelerator pedal depression sensor 21 which detects a depression amount of an accelerator pedal of the vehicle are also provided. The depression amount of the accelerator pedal is used as a signal representing the load of the engine 1.

The detection data of these sensors are input respectively into the controller 25 as signals.

Next, referring to FIGS. 2A and 2B, a regeneration control routine of the DPF 14, executed by the controller 25, will be described. The controller 25 executes this routine at ten millisecond intervals while the engine 1 is operative.

The controller 25 executes a separate routine to determine whether or not regeneration of the DPF 14 is necessary using the aforementioned well-known methods. If, as a result, it is determined that regeneration is necessary, a regeneration flag RFG is set to unity. When regeneration is not necessary, the regeneration flag RFG is reset to zero.

Figure 2A:
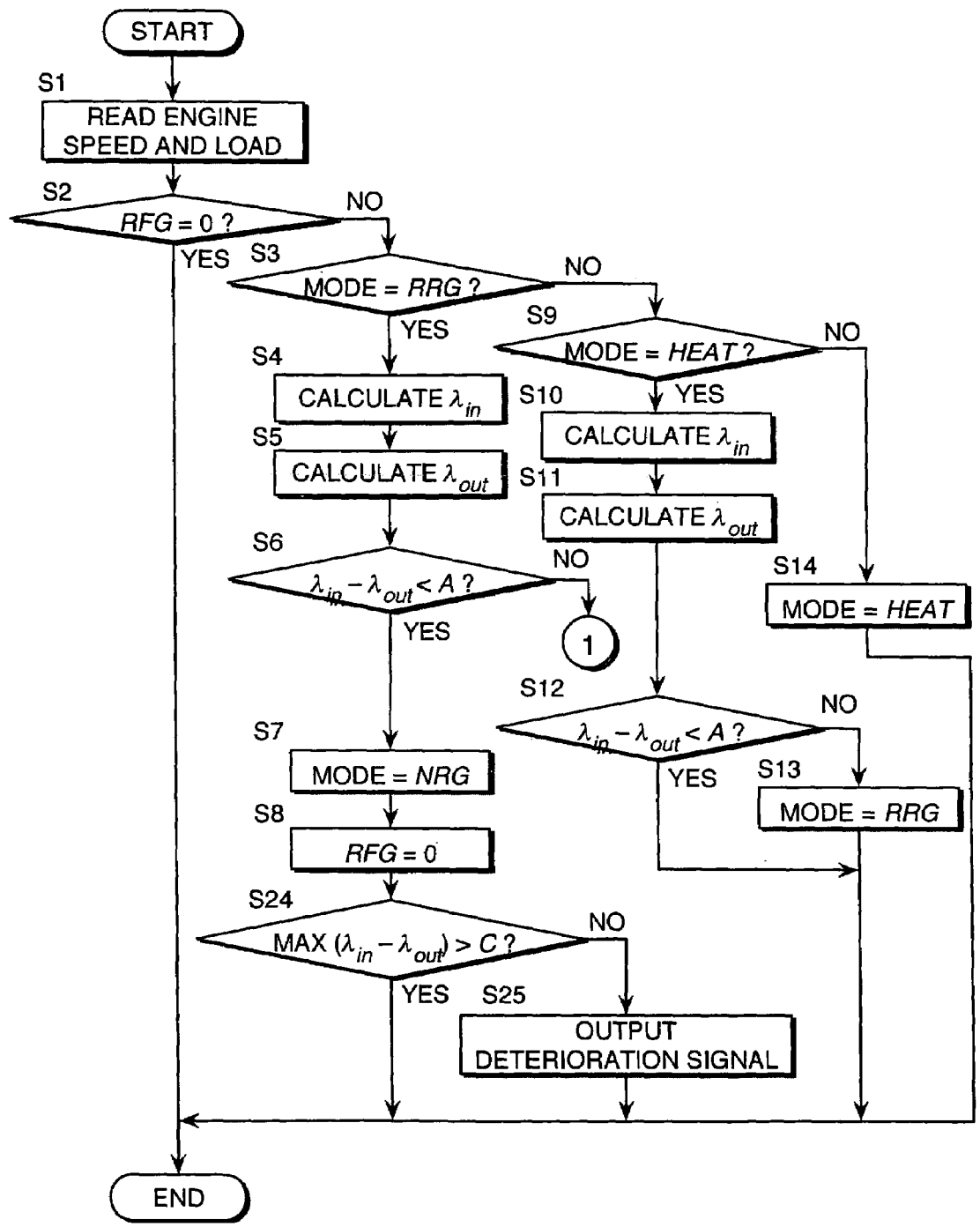
FIGS. 2A and 2B are flowcharts illustrating a DPF regeneration routine executed by a controller according to this invention.
Figure 2B:
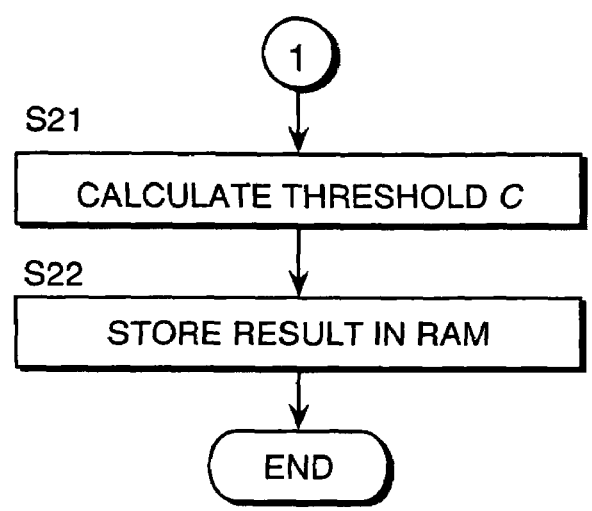

Referring to FIGS. 2A and 2B, in a step S1 the controller 25 reads the rotation speed of the engine 1 from an input signal from the rotation speed sensor 20, and reads the engine load from an input signal from the accelerator pedal depression sensor 21.

Next, in a step S2, the controller 25 determines whether or not the regeneration flag RFG is at zero. When the regeneration flag RFG is at zero, the routine ends immediately without executing the subsequent processes.

When the regeneration flag RFG is not at zero, the controller 25 determines in a step S3 whether or not the DPF 14 is in a substantial regeneration state. A substantial regeneration state signifies that the particulate matter trapped in the DPF 14 is actually burning as a result of a regeneration operation. When the determination in the step S3 is affirmative, the controller 25 performs the processing of a step S4.

When the determination in the step S3 is negative, the controller 25 determines in a step S9 whether or not a temperature raising process is underway in the DPF 14. The temperature raising process indicates a state from the beginning of a regeneration operation to the point at which the particulate matter actually begins to burn.

The determinations of the steps S3 and S9 are performed by determining three mode types, a non-regeneration mode NRG, a temperature raising mode HEAT, and a substantial regeneration mode RRG, which are set in accordance with the regeneration state of the DPF 14 during the routine.

When the determination in the step S9 is affirmative, the controller 25 performs the processing of steps S10-S13. When the determination result in the step S9 is negative, the controller 25 sets the mode to the temperature raising mode in a step S14, and then ends the routine.

Immediately after the regeneration flag RFG changes from zero to unity in the step S2, regeneration of the DPF 14 is not yet underway, and therefore the mode is set to the non-regeneration mode NRG. Hence in this case, the routine advances to the step S14, where the mode is set to the temperature raising mode HEAT. As a result, the determination in the step S9 becomes affirmative in the next execution of the routine, and the controller 25 performs the processing of the steps S10-S13.

In the step S10, the controller 25 calculates an excess air factor $1_{in}$ of the air-fuel mixture from the oxygen concentration detected by the universal exhaust gas oxygen sensor 17 at the inlet to the DPF 14.

Next, in the step S11, the controller 25 calculates an excess air factor $1_{out}$ of the air-fuel mixture from the oxygen concentration detected by the universal exhaust gas oxygen sensor 16 at the outlet of the DPF 14. The excess air factor is a value obtained by dividing the air-fuel ratio of the air-fuel mixture by the stoichiometric air-fuel ratio. The oxygen concentration of the exhaust gas varies in relation to the air-fuel ratio of the air-fuel mixture, and therefore the oxygen concentration of the exhaust gas and the excess air factor of the air-fuel mixture are substantially equivalent.

Next, in the step S12, the controller 25 determines whether or not the difference between the excess air factor $1_{in}$ and the excess air factor $1_{out}$ is smaller than a predetermined value A.

Figure 3A:
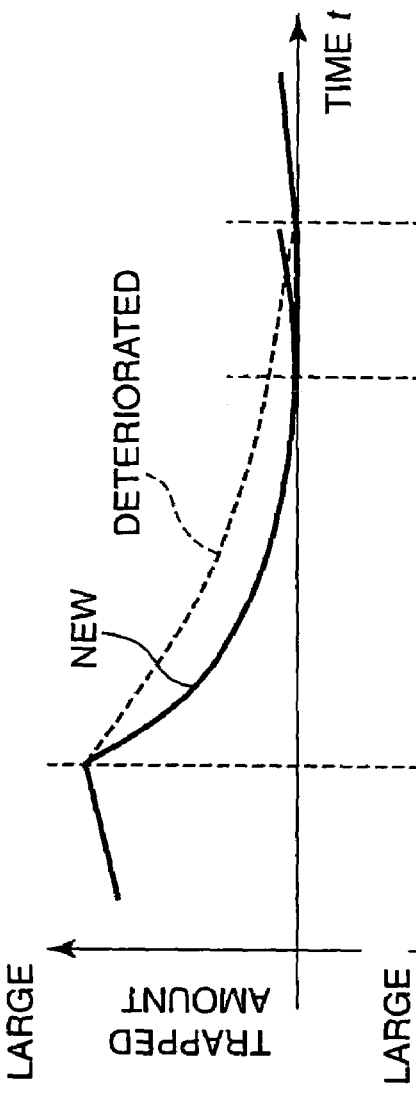
FIGS. 3A and 3B are timing charts illustrating variation in a trapped particulate matter amount and an exhaust gas composition during DPF regeneration.
Figure 3B:
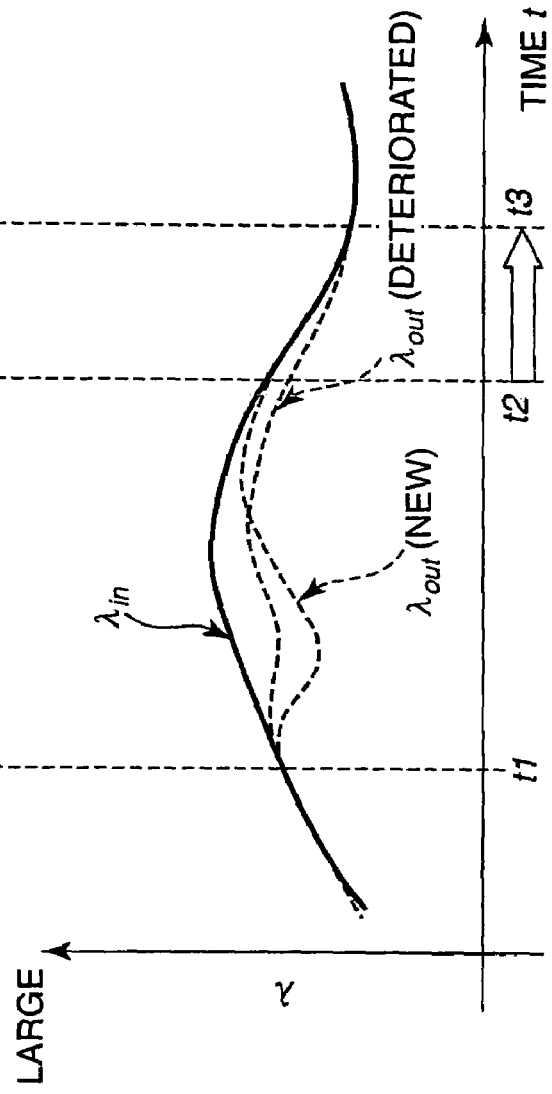
Figure 4:
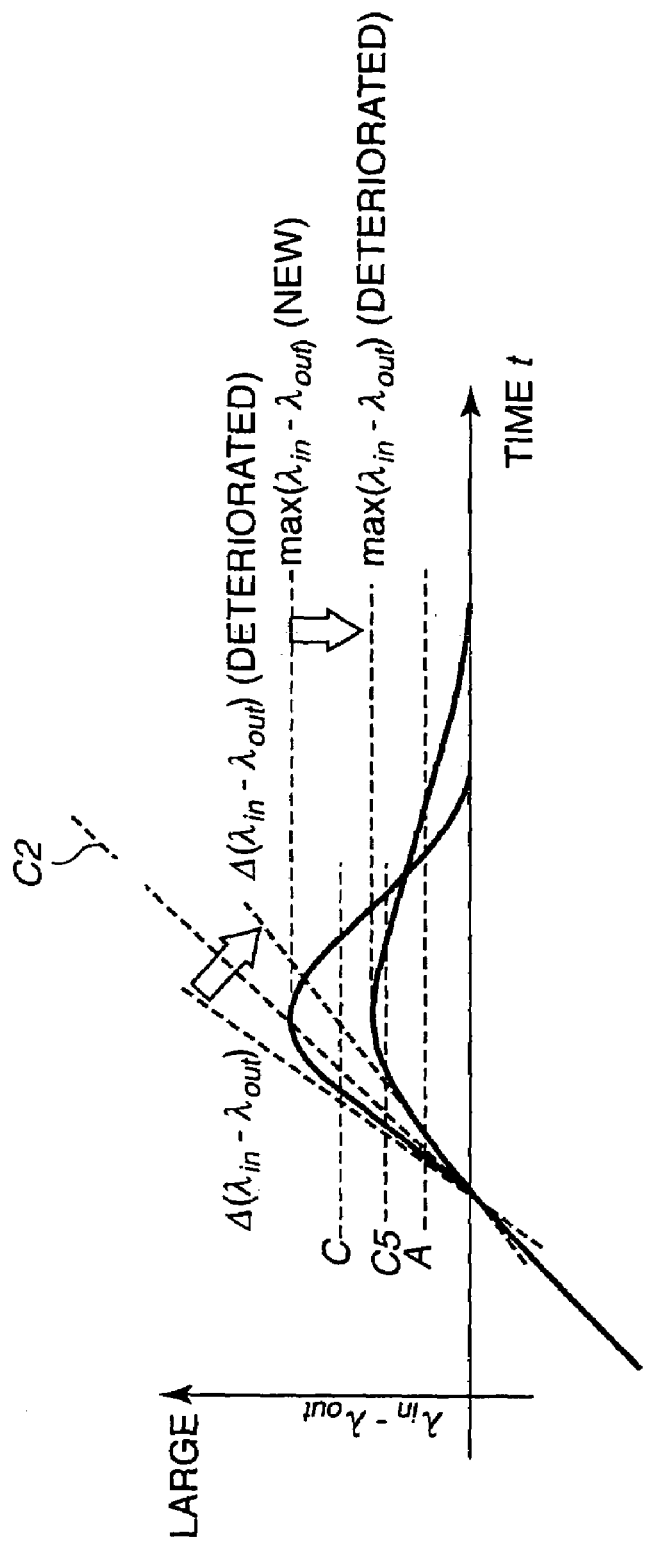
FIG. 4 is a timing chart illustrating variation in an excess air factor calculated respectively from a DPF inlet oxygen concentration and a DPF outlet oxygen concentration.

Referring to FIGS. 3A and 3B and FIG. 4, the predetermined value A will now be described. FIG. 3A shows variation in the trapped particulate matter amount in the DPF 14 during a regeneration operation of the DPF 14. FIG. 3B shows variation in the excess air factor $1_{in}$ and the excess air factor $1_{out}$ under the same conditions. FIG. 4 shows variation in the difference between the excess air factor $1_{in}$ and the excess air factor $1_{out}$ under the same conditions.

Here, a regeneration operation is assumed to begin at a time t1. Prior to the time t1, the particulate matter is not burned, and the trapped amount shows the same variation regardless of whether or not the DPF 14 has deteriorated, as shown in FIG. 3A. In this state, oxygen is not consumed in the DPF 14, and hence the excess air factor $1_{in}$ and the excess air factor $1_{out}$ are substantially equal, as shown in FIG. 3B.

A case in which the DPF 14 has not deteriorated, or in other words when the oxidation promotion performance of the oxidation catalyst is maintained to a sufficient extent, will now be described.

When a regeneration operation begins at the time t1, the particulate matter trapped in the DPF 14 begins to burn, and hence, as shown in FIG. 3A, the trapped amount, which was increasing up to this point, begins to decrease. The oxygen in the exhaust gas is consumed by combustion of the particulate matter, and hence, as shown in FIG. 3B, the excess air factor $1_{out}$ begins to decrease, while the difference between the excess air factor $1_{in}$ and the excess air factor $1_{out}$ increases, as shown in FIG. 4. Here, the oxidation catalyst promotes combustion of the particulate matter.

As the residual particulate matter amount decreases, the combustion becomes gradually less vigorous, and the amount of oxygen consumed by the combustion decreases. As a result, the difference between the excess air factor $1_{in}$ and the excess air factor $1_{out}$ decreases, as shown in FIG. 4.

When the trapped amount reaches zero at a time t2, combustion of the particulate matter ends, or in other words regeneration ends, and the difference between the excess air factor $1_{in}$ and the excess air factor $1_{out}$ reaches zero.

Hence by monitoring the difference between the excess air factor $1_{in}$ and the excess air factor $1_{out}$, the beginning and end of the actual combustion of the particulate matter can be detected.

In this embodiment, considering individual differences between and age-related deterioration of the universal exhaust gas oxygen sensors 16 and 17, regeneration of the DPF 14 is assumed to begin substantially at the point where the difference between the excess air factor $1_{in}$ and the excess air factor $1_{out}$ reaches the predetermined value A, and regeneration of the DPF 14 is assumed to end substantially at the point where the difference between the excess air factor $1_{in}$ and the excess air factor $1_{out}$ falls below the predetermined value A. The predetermined value A is for example set to 10 percent of the maximum value of ($1_{in} - 1_{out}$) when the DPF 14 has not deteriorated By determining the beginning and end of regeneration of the DPF 14 on the basis of the oxygen concentration difference in this manner, it is possible to grasp the fact that regeneration is underway in only a part of the DPF 14, for example, appropriately from the variation in the difference between the excess air factor $1_{in}$ and the excess air factor $1_{out}$.

Thus the beginning and end of regeneration of the DPF 14 can be determined accurately. It is difficult to obtain the same degree of determination precision when the beginning and end of regeneration of the DPF 14 are determined on the basis of the differential pressure upstream and downstream of the DPF 14 or temperature variation in the DPF 14.

In FIG. 3B, the difference between the excess air factor $1_{in}$ and the excess air factor $1_{out}$ once regeneration has begun varies about a plurality of points of inflection. This is due to the fact that the excess air factor $1_{in}$ is controlled to ensure that the particulate matter combustion speed does not rise excessively, and the fact that the excess air factor $1_{out}$ varies in a predetermined relationship with the variation in the excess air factor $1_{in}$.

When the determination in the step S12 becomes negative, this indicates that regeneration of the DPF 14 has substantially begun. In this case, the controller 25 sets the mode to the substantial regeneration mode RRG in the step S13, and then ends the routine. When the determination in the step S12 is affirmative, the controller 25 ends the routine immediately. In this case, the mode remains at the temperature raising mode HEAT.

When the mode is set to the substantial regeneration mode RRG, the determination in the step S3 during the next execution of the routine becomes affirmative, and hence the controller 25 performs the processing from a step S4 onward.

In the step S4, the controller 25 calculates the excess air factor $1_{in}$ of the air-fuel mixture from the oxygen concentration detected by the universal exhaust gas oxygen sensor 17 at the inlet to the DPF 14, similarly to the step S10.

Next, in a step S5, the controller 25 calculates the excess air factor $1_{out}$ of the air-fuel mixture from the oxygen concentration detected by the universal exhaust gas oxygen sensor 16 at the outlet of the DPF 14, similarly to the step S11.

Next, in a step S6, the controller 25 determines whether or not the difference between the excess air factor $1_{in}$ and the excess air factor $1_{out}$ is smaller than the predetermined value A. When the determination in the step S6 is affirmative, this indicates that regeneration of the DPF 14 has substantially ended.

When the determination in the step S6 is negative, or in other words when regeneration of the DPF 14 is still underway, the controller 25 calculates a threshold C for determining deterioration of the DPF 14 in a step S21 in FIG. 2B. The threshold C corresponds to the difference between the excess air factor $1_{in}$ and the excess air factor $1_{out}$ when the DPF 14 has deteriorated to the extent that it must be replaced. The threshold C varies in accordance with the rotation speed and load of the engine 1.

Figure 5:
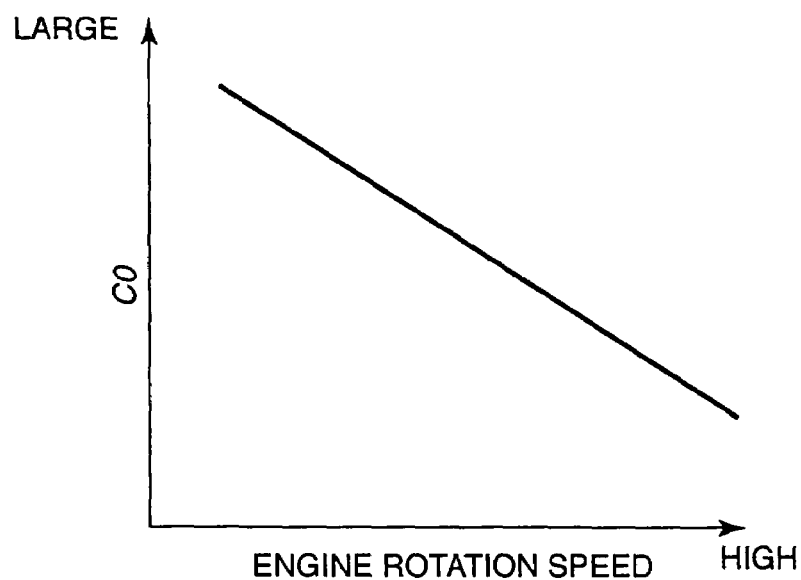
FIG. 5 is a diagram showing the characteristics of a map of a deterioration determination basic value C0, which is stored by the controller.

First, using the rotation speed of the engine 1 as a parameter, the controller 25 determines a threshold basic value C0 by referring to a map having the characteristics shown in FIG. 5, which is stored in the ROM in advance. Referring to FIG. 5, the threshold basic value C0 increases as the rotation speed of the engine 1 increases.

Figure 6:
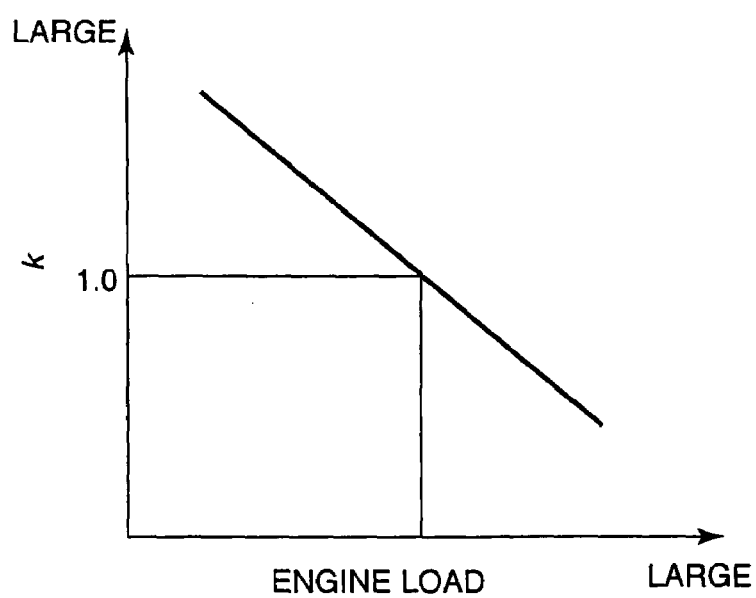
FIG. 6 is a diagram showing the characteristics of a map of a load correction coefficient k, which is stored by the controller.

Next, using the load of the engine 1 as a parameter, the controller 25 determines a load correction coefficient k by referring to a map having the characteristics shown in FIG. 6, which is stored in the ROM in advance. Referring to FIG. 6, the load correction coefficient k decreases as the load of the engine 1 increases.

Next, the controller 25 calculates the threshold C using the following equation (1).

$$C = C0 \cdot k$$

Referring back to FIGS. 3A and 3B and FIG. 4, the significance of the threshold C will now be described.

As shown by the broken line in FIG. 3A, when the DPF 14 deteriorates, combustion of the particulate matter becomes less vigorous during regeneration, in particular immediately after the beginning of regeneration, and hence the decrease rate of the trapped particulate matter amount falls.

As a result, the amount of oxygen consumed in the DPF 14 decreases such that the difference between the excess air factor $1_{in}$ and the excess air factor $1_{out}$ becomes smaller, as shown in FIG. 4. It should be noted, however, that the maximum value of the difference between the excess air factor $1_{in}$ and the excess air factor $1_{out}$ differs according to the operating conditions of the engine 1.

Figure 7A:
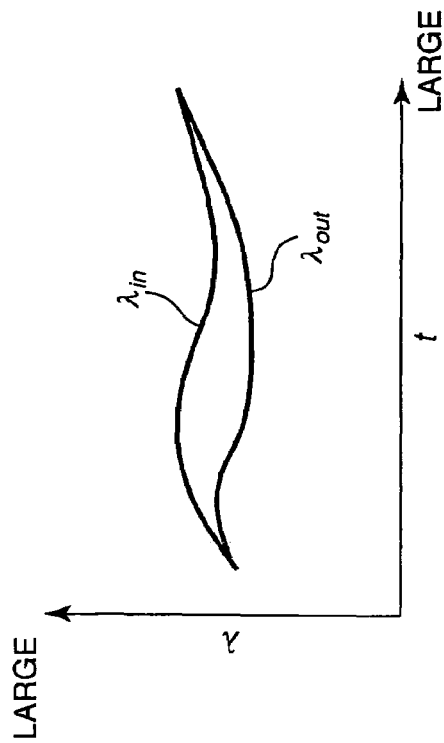
FIGS. 7A-7C are timing charts illustrating a relationship between an engine rotation speed and variation in the exhaust gas composition upstream and downstream of the DPF.
Figure 7B:
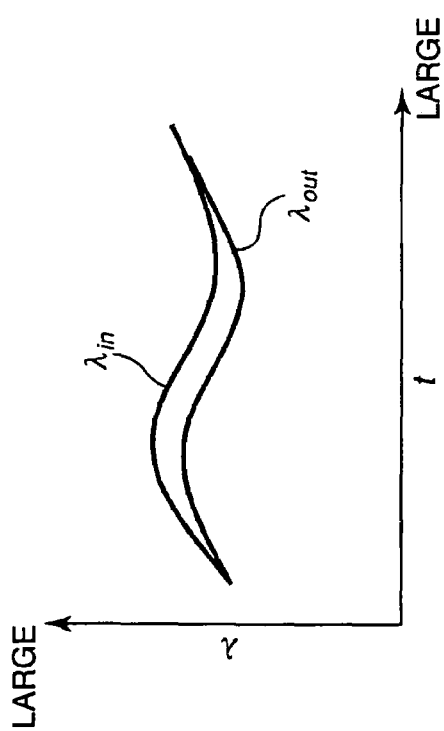
Figure 7C:
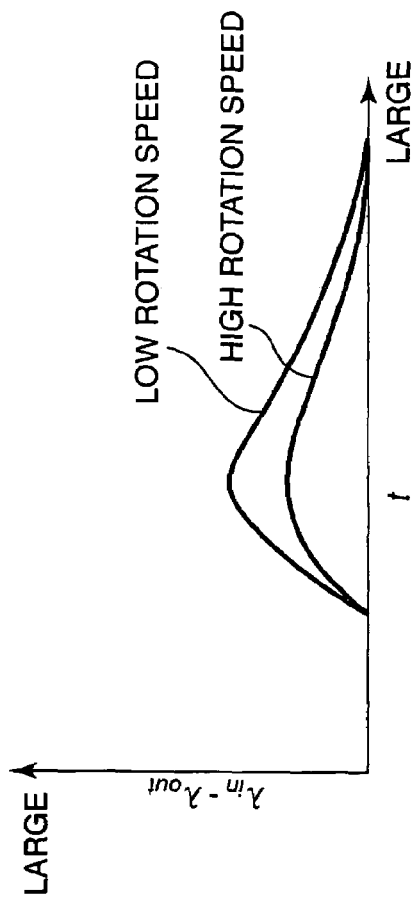

Referring to FIGS. 7A-7C, this difference will be described.

FIG. 7A shows variation in the excess air factor $1_{in}$ and the excess air factor $1_{out}$ when the DPF 14 has deteriorated and the engine 1 rotates at high speed. FIG. 7B shows variation in the excess air factor $1_{in}$ and the excess air factor $1_{out}$ when the DPF 14 has deteriorated and the engine 1 rotates at low speed. FIG. 7C shows the difference between the excess air factor $1_{in}$ and the excess air factor $1_{out}$ in FIGS. 7A and 7B.

As can be seen from FIG. 7C, the difference between the excess air factor $1_{in}$ and the excess air factor $1_{out}$ differs according to the rotation speed of the engine 1, even when the DPF 14 has deteriorated to the same extent. The peak value of the difference between the excess air factor $1_{in}$ and the excess air factor $1_{out}$ at a low rotation speed is greater than the peak value at a high rotation speed.

As described above, the rotation speed of the engine 1 alters the difference between the excess air factor $1_{in}$ and the excess air factor $1_{out}$, but the load of the engine 1 also affects the difference between the excess air factor $1_{in}$ and the excess air factor $1_{out}$ in a similar manner. In other words, the peak value of the difference between the excess air factor $1_{in}$ and the excess air factor $1_{out}$ when the engine 1 is at low load is greater than the peak value when the engine 1 is at high load.

Because of this relationship between the operating conditions of the engine 1 and the difference between the excess air factor $1_{in}$ and the excess air factor $1_{out}$, the threshold C is set in accordance with the operating conditions of the engine 1 using the equation (1) in this routine. A typical value of the threshold C is 30 percent of the maximum value of $(1_{in}-1_{out})$ when the DPF 14 has not deteriorated Next, in a step S22, the controller 25 stores a pair comprising $1_{in}-1_{out}$, calculated in the step S6 and the threshold C, calculated in the step S21, in the RAM, and then ends the routine.

Meanwhile, when the determination in the step S6 switches from negative to affirmative, or in other words when regeneration of the DPF 14 substantially ends, the controller 25 sets the mode to the non-regeneration mode NRG in a step S7.

Next, in a step S8, the controller 25 resets the regeneration flag RFG to zero.

Next, in a step S24, the controller 25 determines a maximum value $MAX(1_{in}-1_{out})$ of the difference $1_{in}-1_{out}$ between the excess air factor $1_{in}$ and the excess air factor $1_{out}$, stored in the RAM of the controller 25 during regeneration of the DPF 14, and reads the corresponding threshold C from the RAM. The controller 25 then determines whether or not $MAX(1_{in}-1_{out})$ is greater than the corresponding threshold C.

When the determination is affirmative, the controller 25 ends the routine without any further processing. When the determination is negative, the controller 25 outputs a deterioration signal indicating deterioration of the DPF 14 in a step S25, and then ends the routine. This signal is used to inform a driver of the vehicle that the DPF 14 has deteriorated by causing a warning light provided in the vehicle to flash.

Referring back to FIG. 4, the maximum value of the difference $1_{in}-1_{out}$ between the excess air factor $1_{in}$ and the excess air factor $1_{out}$ when the DPF 14 has not deteriorated exceeds the maximum value when the DPF 14 has deteriorated. Hence, by determining whether or not the maximum value $MAX(1_{in}-1_{out})$ is greater than the corresponding threshold C, deterioration of the DPF 14 can be determined.

By calculating the threshold C on the basis of the operating conditions of the engine 1 at the time of calculation using the equation (1), rather than fixing the threshold C at a constant value, deterioration of the DPF 14 can be determined precisely without influence from the operating conditions of the engine 1.

Thus deterioration of the DPF 14 can be determined with a high degree of precision from the difference between the oxygen concentration at the inlet to the DPF 14 and the oxygen concentration at the outlet of the DPF 14 during regeneration.

Next, referring to FIGS. 8A and 8B, a second embodiment of this invention, relating to a deterioration diagnosis algorithm, will be described.

In this embodiment, steps S31-S33 are provided in place of the steps S21-S22 in FIG. 2B, and a step S34 is provided in place of the step S24 in FIG. 2A. The other steps of the routine are identical to those of the first embodiment.

Figure 8B:
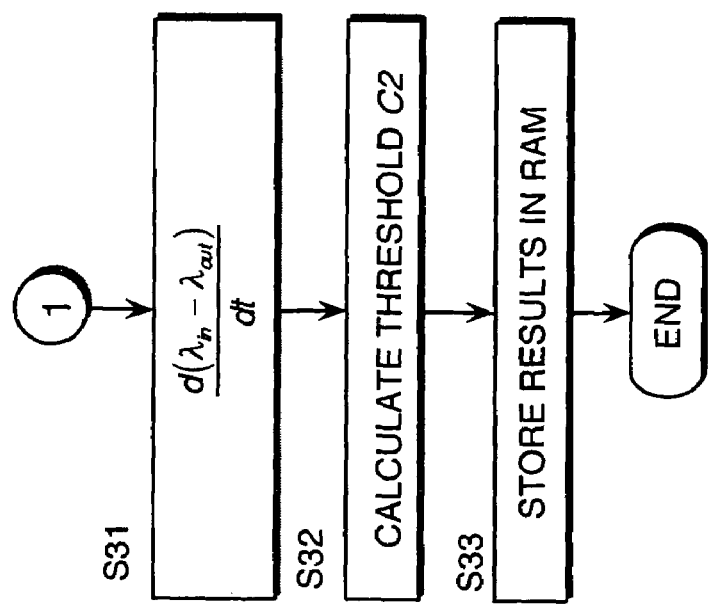
FIGS. 8A and 8B are flowcharts illustrating a second embodiment of this invention, relating to a DPF deterioration diagnosis algorithm.

In the step S31 in FIG. 8B, the controller 25 calculates a rate of change $$\frac{d(1_{in} - 1_{out})}{dt}$$

in the difference $1_{in}-1_{out}$ between the excess air factor $1_{in}$ and the excess air factor $1_{out}$. More specifically, the controller 25 calculates a deviation in the difference $(1_{in}-1_{out})_{n-1}$ between the excess air factor $1_{in}$ and the excess air factor $1_{out}$ during the preceding execution of the routine, and the difference $(1_{in}-1_{out})$ between the excess air factor $1_{in}$ and the excess air factor $1_{out}$ calculated during the current execution of the routine.

Next, in a step S32, the controller 25 calculates a threshold C2. The threshold C2 varies in accordance with the rotation speed and load of the engine 1, similarly to the threshold C in the first embodiment. A typical value of the threshold C2 is 30 percent of the maximum value of $$\frac{d(1_{in} - 1_{out})}{dt}$$

when the DPF 14 has not deteriorated

In the step S33, the rate of change calculated in the step S31 and the threshold C2 calculated in the step S32 are paired and stored in the RAM of the controller 25.

Figure 8A:
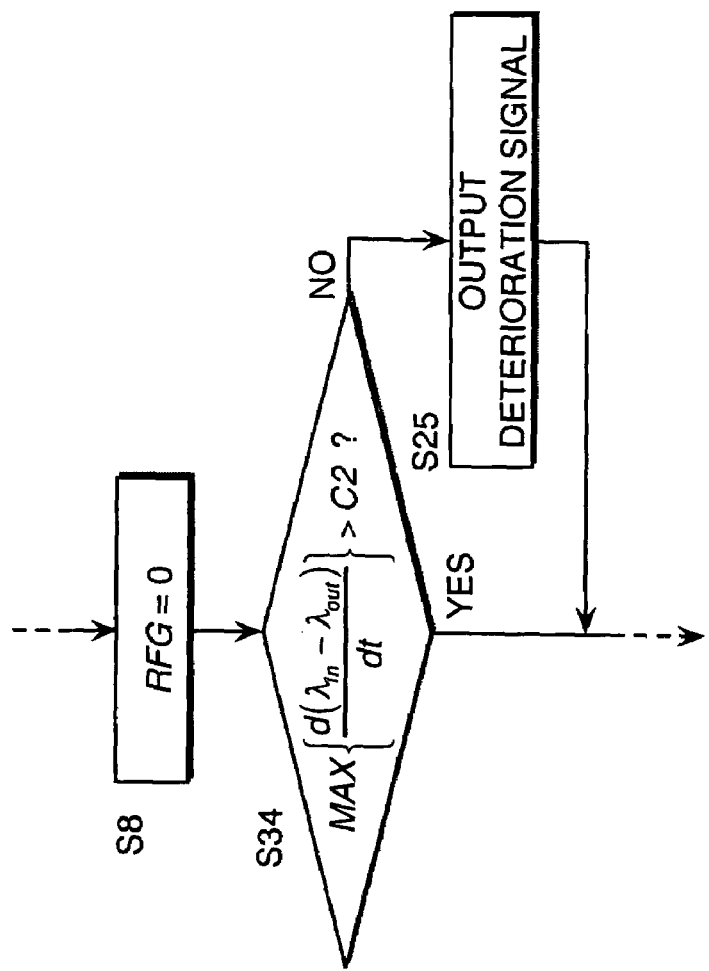

In the step S34 shown in FIG. 8A, the controller 25 determines whether or not the maximum value of the rate of change $$\frac{d(1_{in} - 1_{out})}{dt},$$

stored in the RAM during regeneration of the DPF 14, exceeds the corresponding threshold C2. When the determination is affirmative, the controller 25 ends the routine with no further processing. When the determination is negative, the controller 25 outputs a signal indicating deterioration of the DPF 14 in the step S25, as in the first embodiment, and then ends the routine.

Referring to FIG. 4, the rate of change $$\frac{d(1_{in} - 1_{out})}{dt}$$

in the difference between the excess air factor $1_{in}$ and the excess air factor $1_{out}$ is expressed as an incline of the curve in the drawing. The rate of change $$\frac{d(1_{in} - 1_{out})}{dt}$$

reaches a maximum value immediately after the beginning of regeneration, regardless of deterioration of the DPF 14. The maximum value decreases as deterioration of the DPF 14 advances.

Hence in this embodiment, deterioration of the DPF 14 is determined by comparing the maximum value of the rate of change $$\frac{d(1_{in} - 1_{out})}{dt}$$

with the threshold C2.

Deterioration of the DPF 14 can be diagnosed in this embodiment with a similarly high degree of precision to that of the first embodiment.

Next, referring to FIGS. 9A and 9B, a third embodiment of this invention, relating to a deterioration diagnosis algorithm, will be described.

In this embodiment, steps S41-S43 are provided in place of the steps S21-S22 in FIG. 2B, and a step S44 is provided in place of the step S24 in FIG. 2A. The other steps of the routine are identical to those of the first embodiment.

Figure 9B:
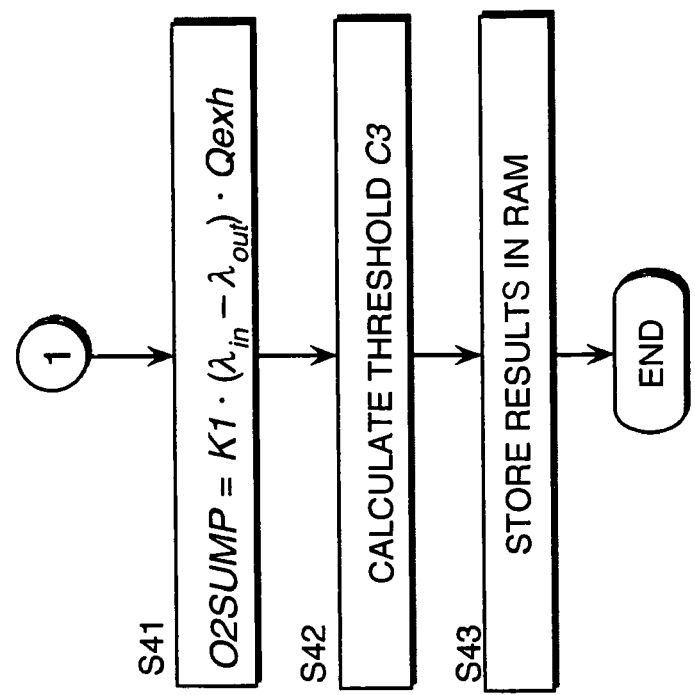
FIGS. 9A and 9B are similar to FIGS. 8A and 8B, but illustrate a third embodiment of this invention.

In the step S41 in FIG. 9B, the controller 25 calculates an oxygen consumption amount O2SUMP using the following equation (2). The oxygen consumption amount O2SUMP indicates the amount of oxygen consumed by combustion of the particulate matter trapped in the DPF 14.

O2SUMP=K1·($1_{in}$−$1_{out}$)·Qexh where K1=a constant, and
Qexh=an exhaust gas flowrate.

Figure 10:
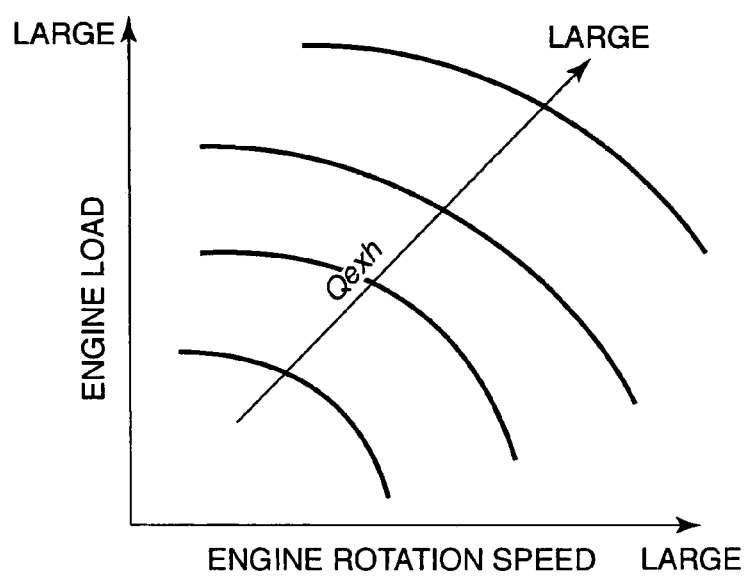
FIG. 10 is a diagram showing the characteristics of a map of an exhaust gas flow, which is stored by a controller according to the third embodiment of this invention.

The equation (2) shows that the oxygen consumption amount O2SUMP has a proportional relationship with both the difference in oxygen concentration at the inlet and outlet of the DPF 14 and the exhaust gas flowrate Qexh. The exhaust gas flowrate Qexh is determined using the rotation speed and load of the engine 1 as parameters by referring to a map having the characteristics shown in FIG. 10, which is stored in the memory in advance by the controller 25. Referring to FIG. 10, the exhaust gas flow Qexh takes a greater value as the rotation speed and load of the engine 1 increase.

Next, in the step S42, the controller 25 calculates a threshold C3. The threshold C3 corresponds to the oxygen consumption amount when the DPF 14 has deteriorated to the extent that it must be replaced. The oxygen consumption amount O2SUMP increases as the rotation speed and load of the engine 1 increase, even when the degree of deterioration in the DPF 14 is constant. Hence the threshold C3 is also varied according to the rotation speed and load of the engine 1, similarly to the threshold C of the first embodiment. A typical value of the threshold C3 is 30 percent of the maximum value of O2SUMP when the DPF 14 has not deteriorated Next, in the step S43, the controller 25 pairs the oxygen consumption amount O2SUMP calculated in the step S41 and the threshold C3 calculated in the step S42, and stores the pair in the RAM.

Figure 9A:
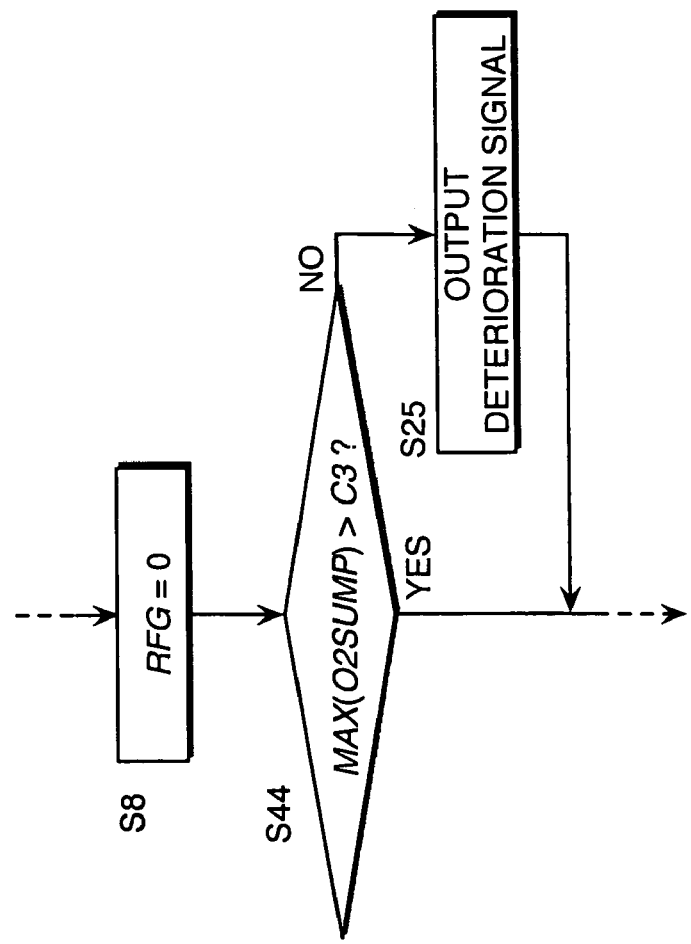

In the step S44 shown in FIG. 9A, the controller 25 determines whether or not the maximum value of the oxygen consumption amount O2SUMP, stored in the RAM during regeneration of the DPF 14, exceeds the corresponding threshold C3. When the determination of the step S44 is affirmative, the controller 25 ends the routine with no further processing.

When the determination of the step S44 is negative, the controller 25 outputs a signal indicating deterioration of the DPF 14 in the step S25, as in the first embodiment, and then ends the routine.

Deterioration of the DPF 14 can be diagnosed in this embodiment with a similarly high degree of precision to that of the first embodiment.

Figure 11:
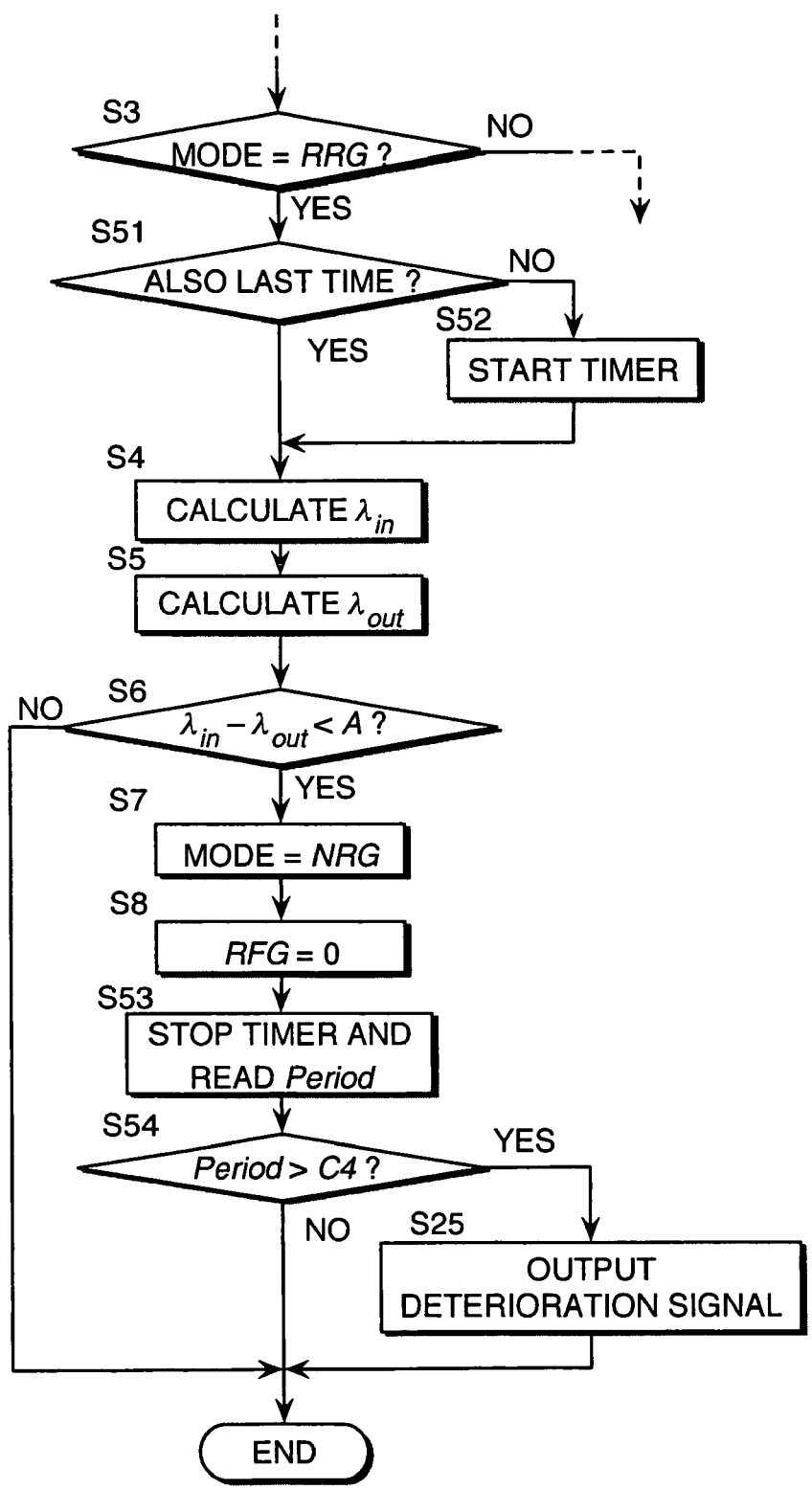
FIG. 11 is a flowchart illustrating a DPF regeneration routine, executed by a controller according to a fourth embodiment of this invention.

Next, referring to FIG. 11, a fourth embodiment of this invention, relating to a deterioration diagnosis algorithm, will be described.

In this embodiment, the steps S21-S22 and the step S24 are deleted from the routines in FIGS. 2A and 2B, and replaced with steps S51-S54. The other steps of the routine are identical to those of the first embodiment.

When the determination in the step S3 is affirmative, the controller 25 determines whether or not the preceding determination in the step S51 was also affirmative. This determination is only negative, immediately after the mode has been switched to the substantial regeneration mode RRG, and becomes affirmative when substantial regeneration continues thereafter.

When the determination in the step S51 is negative the controller 25 activates a timer in the step S52. The timer is constituted using a clock provided in the microcomputer which constitutes the controller 25. Following the processing of the step S52, the controller 25 performs the processing of the step S4 onward. When the determination of the step S51 is affirmative, the controller 25 skips the step S52 and performs the processing of the step S4 onward immediately.

By means of the processing of the steps S51 and S52, the timer is activated in alignment with the beginning of substantial regeneration of the DPF 14. Thereafter, the timer measures the elapsed time from the beginning of substantial regeneration of the DPF 14.

When the determination result in the step S6 is negative, or in other words when substantial regeneration of the DPF 14 is not complete, the controller 25 ends the routine with no further processing.

When the determination result in the step S6 is affirmative, or in other words when substantial regeneration of the DPF 14 is complete, the controller 25 performs the processing of the steps S7 and S8, and then reads a measurement value Period of the timer and stops timer measurement in the step S53.

Next, in the step S54, the controller 25 determines whether or not the measurement value Period of the timer exceeds a threshold C4. When the determination of the step S54 is negative, the controller 25 ends the routine with no further processing. When the determination result of the step S54 is affirmative, the controller 25 outputs a signal indicating deterioration of the DPF 14 in the step S25, as in the first embodiment, and then ends the routine. Herein, the threshold C4 is set to for example three times of the value of Period when the DPF 14 has not deteriorated Referring to FIGS. 3A and 3B, when the DPF 14 has not deteriorated, regeneration ends at the time t2. When the DPF 14 has deteriorated, regeneration does not end until a later time t3. Accordingly, it is possible to determine whether or not the DPF 14 has deteriorated on the basis of the required regeneration time.

The threshold C4 corresponds to the required regeneration time when the DPF 14 has deteriorated to the extent that it must be replaced. The required regeneration time increases as the rotation speed and load of the engine 1 increase, even when the degree of deterioration in the DPF 14 is constant. Hence the threshold C4 is also preferably varied according to the rotation speed and load of the engine 1.

It should be noted, however, that in contrast to the first through third embodiments, the threshold C4 is not calculated upon every execution of the routine, but takes a value representing the substantial regeneration period. It is therefore preferable that the threshold C4 be set on the basis of the respective average values of the rotation speed and load of the engine 1 throughout the substantial regeneration period.

Deterioration of the DPF 14 can be diagnosed in this embodiment with a similarly high degree of precision to that of the first embodiment.

In each of the embodiments described above, the thresholds C, C2-C4 are calculated by first calculating a basic value from the engine rotation speed, and then correcting the basic value using a correction coefficient set in accordance with the engine load. However, the basic value may be calculated on the basis of the engine load and corrected using a correction coefficient set in accordance with the engine rotation speed.

Next, referring to FIGS. 12A and 12B, a fifth embodiment of this invention, relating to a deterioration diagnosis algorithm, will be described.

In this embodiment, the steps S62-S65 are provided in place of the steps S21-S22 in FIG. 2B, and a step S61 is provided in place of the step S24 in FIG. 2A. The other steps of the routine are identical to those of the first embodiment.

Figure 12B:
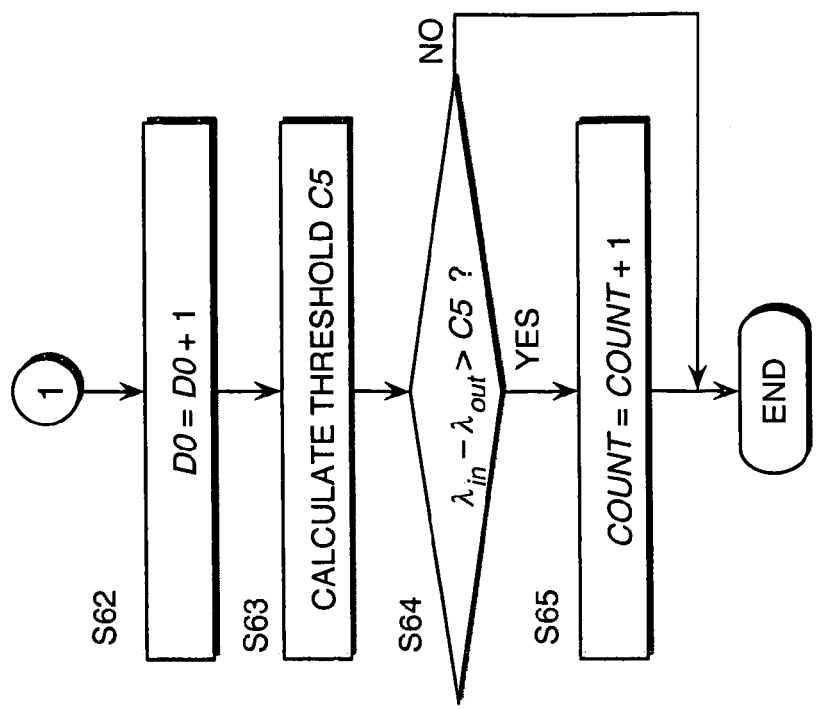
FIGS. 12A and 12B are similar to FIGS. 8A and 8B, but illustrate a fifth embodiment of this invention.

When the determination of the step S6 of FIG. 2A is negative, the controller 25 performs the processing of FIG. 12B. Herein, the controller 25 first increments a counter value D0 in a step S62. The counter value D0 denotes the number of times when the determination of the step S6 has been determined to be negative. In a next step S63, the controller 25 calculates a threshold C5 for determining deterioration of the DPF 14. The threshold C5 is a value between the threshold C and the predetermined value A of the first embodiment. The threshold C5 is for example set to 20 percent of the maximum value of $(1_{in}-1_{out})$ when the DPF 14 has not deteriorated In the next step S64, the controller 25 determines whether or not the difference $1_{in}-1_{out}$ between the excess air factor $1_{in}$ and the excess air factor $1_{out}$ is greater than the threshold C5. When the determination in the step S64 is affirmative, the controller 25 increments a counter value COUNT in a step S65, and then ends the routine. When the determination is negative, the controller 25 ends the routine immediately. The initial values of both the counter values D0 and COUNT are zero.

Figure 12A:
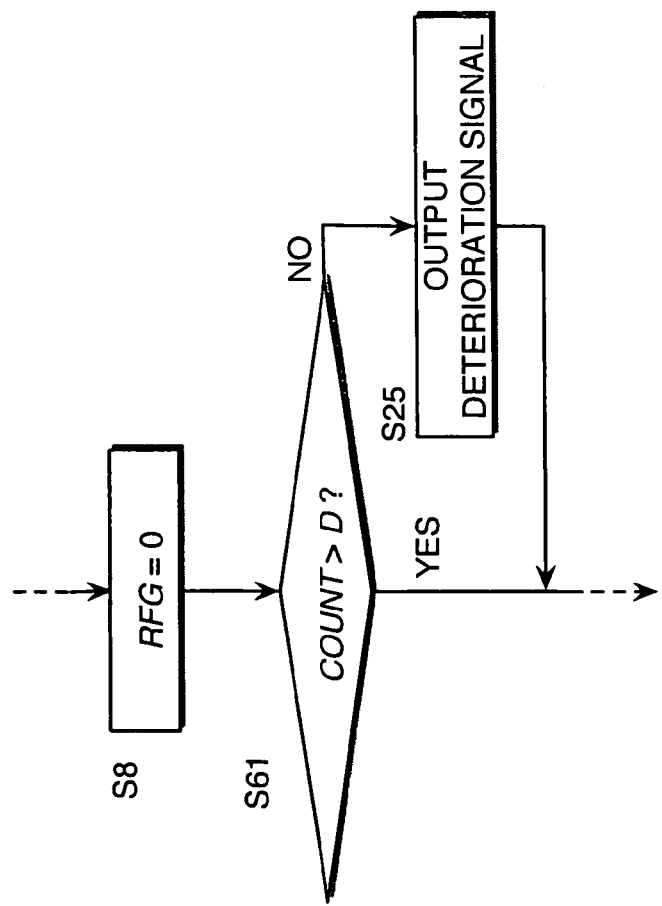

In FIG. 12A, following the processing of the step S8, the controller 25 determines in the step S61 whether or not the counter value COUNT is greater than a threshold D. The threshold D is for example set to 30 percent of the counter value D0.

When the determination in the step S61 is affirmative, the controller 25 ends the routine immediately. When the determination in the step S61 is negative, the controller 25 outputs a signal indicating deterioration of the DPF 14 in the step S25, as in the first embodiment, and then ends the routine.

Referring to FIG. 4, when the DPF 14 has not deteriorated, the period during which the difference $1_{in}-1_{out}$ exceeds the threshold C5 during the regeneration period is long. In this embodiment, the number of times that the difference $1_{in}-1_{out}$ exceeds the threshold C5 during the regeneration period is counted as the counter value COUNT. As a result of the regeneration, $1_{in}-1_{out}$ falls below the predetermined value A, and hence the controller 25 sets the mode to the non-regeneration mode NRG in the step S7, and resets the regeneration flag RFG to zero in the step S8. The controller 25 then compares the counter value COUNT to the threshold D to determine whether or not the DPF 14 has deteriorated. Here, the counter value COUNT represents the length of the period during which the difference $1_{in}-1_{out}$ exceeds the threshold C5 during the substantial regeneration period.

The contents of Tokugan 2004-053426, with a filing date of Feb. 27, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the steps S4, S5, S10, and S11 in each of the embodiments described above, the oxygen concentration detected by the universal exhaust gas oxygen sensors 16 and 17 is converted into an excess air factor. However, the difference in the oxygen concentrations detected by the universal exhaust gas oxygen sensors 16 and 17 may be used directly to perform the determination in the step S6, or the step S12.

The subject matter of this invention, shared by all of the embodiments, is that the substantial regeneration time of the DPF 14 is defined by the difference between the oxygen concentration upstream of the DPF 14 and the oxygen concentration downstream of the DPF 14, and deterioration of the DPF 14 is diagnosed using a parameter based on the difference between the oxygen concentration upstream of the DPF 14 and the oxygen concentration downstream of the DPF 14. The other elements illustrated in the embodiments are not essential elements of this invention.

In each of the embodiments described above, the parameters required for control are detected respectively using sensors, but this invention is not dependent on a method of obtaining parameters, and may be applied to any deterioration diagnosing device which executes the claimed control using parameters.

The embodiments of this invention in which an exclusive property or privilege is claimed are defined as follows:

What is claimed is:

1. A deterioration diagnosing device for use with a particulate filter which is interposed on an exhaust passage of an internal combustion engine to trap a particulate matter contained in an exhaust gas, the filter comprising an oxidation catalyst which promotes oxidation of the particulate matter so that the filter is regenerated using the oxidation catalyst by burning the trapped particulate matter in a high-temperature atmosphere, the deterioration diagnosing device comprising:
    a first sensor which detects an oxygen concentration of the exhaust gas in the exhaust passage upstream of the filter as a first concentration;
    a second sensor which detects an oxygen concentration of the exhaust gas in the exhaust passage downstream of the filter as a second concentration; and
    a programmable controller programmed to:
        determine that a regeneration of the filter has substantially begun when the difference between an excess air factor corresponding to the first concentration and an excess air factor corresponding to the second concentration is not less than a predetermined value;
        determine that the regeneration of the filter has substantially ended when the difference falls below the predetermined value; and
        determine whether or not the oxidation catalyst has deteriorated in relation to a substantial regeneration period from the beginning of the substantial regeneration of the filter to the end of the substantial regeneration of the filter.

2. The deterioration diagnosing device as defined in claim 1, wherein the first sensor and the second sensor are both constituted by a universal exhaust gas oxygen sensor.

3. The deterioration diagnosing device as defined in claim 1, wherein the controller is further programmed to compare a maximum value of the difference during the substantial regeneration period with a predetermined threshold, and determine that the oxidation catalyst has deteriorated when the maximum value does not exceed the threshold.

4. The deterioration diagnosing device as defined in claim 3, wherein the device further comprises a sensor which detects an operating condition of the engine, and the controller is further programmed to calculate the threshold on the basis of the operating condition of the engine.

5. The deterioration diagnosing device as defined in claim 4, wherein the sensor which detects the operating condition of the engine is constituted by a sensor which detects a rotation speed of the engine, and a sensor which detects a load of the engine.

6. The deterioration diagnosing device as defined in claim 5, wherein the controller is further programmed to increase the threshold as the rotation speed increases, and reduce the threshold as the load increases.

7. The deterioration diagnosing device as defined in claim 6, wherein the controller is further programmed to calculate a basic value of the threshold on the basis of the rotation speed, calculate a load correction coefficient on the basis of the load, and calculate the threshold by multiplying the load correction coefficient to the threshold basic value.

8. The deterioration diagnosing device as defined in claim 1, wherein the controller is further programmed to calculate a rate of change of the difference, compare a maximum value of the rate of change during the substantial regeneration period to a predetermined threshold, and determine that the oxidation catalyst has deteriorated when the maximum value does not exceed the threshold.

9. The deterioration diagnosing device as defined in claim 1, wherein the controller is further programmed to calculate an oxygen consumption amount accompanying the regeneration of the filter from the difference, compare a maximum value of the oxygen consumption amount during the substantial regeneration period to a predetermined threshold, and determine that the oxidation catalyst has deteriorated when the maximum value does not exceed the threshold.

10. The deterioration diagnosing device as defined in claim 9, wherein the device further comprises a sensor which detects a rotation speed of the engine, and a sensor which detects a load of the engine, and the controller is further programmed to calculate an exhaust gas flow of the engine on the basis of the rotation speed and the load, and increase the oxygen consumption amount as the exhaust gas flow increases.

11. The deterioration diagnosing device as defined in claim 1, wherein the controller is further programmed to compare a length of the substantial regeneration period to a predetermined threshold, and determine that the oxidation catalyst has deteriorated when the length of the substantial regeneration period exceeds the threshold.

12. The deterioration diagnosing device as defined in claim 1, wherein the controller is further programmed to calculate a period during which the difference during the substantial regeneration period exceeds a predetermined threshold that is greater than the predetermined value, and determine whether or not the oxidation catalyst has deteriorated on the basis of the period.

13. A deterioration diagnosing device for use with a particulate filter which is interposed on an exhaust passage of an internal combustion engine to trap a particulate matter contained in an exhaust gas, the filter comprising an oxidation catalyst which promotes oxidation of the particulate matter so that the filter is regenerated using the oxidation catalyst by burning the trapped particulate matter in a high-temperature atmosphere, the deterioration diagnosing device comprising:
    means for detecting an oxygen concentration of the exhaust gas in the exhaust passage upstream of the filter as a first concentration;
    means for detecting an oxygen concentration of the exhaust gas in the exhaust passage downstream of the filter as a second concentration;
    means for determining that a regeneration of the filter has substantially begun when the difference between an excess air factor corresponding to the first concentration and an excess air factor corresponding to the second concentration is not less than a predetermined value;
    means for determining that the regeneration of the filter has substantially ended when the difference falls below the predetermined value; and
    means for determining whether or not the oxidation catalyst has deteriorated in relation to a substantial regeneration period from the beginning of the substantial regeneration of the filter to the end of the substantial regeneration of the filter.

14. A deterioration diagnosing method for a particulate filter which is interposed on an exhaust passage of an internal combustion engine to trap a particulate matter contained in an exhaust gas, the filter comprising an oxidation catalyst which promotes oxidation of the particulate matter so that the filter is regenerated using the oxidation catalyst by burning the trapped particulate matter in a high-temperature atmosphere, the deterioration diagnosing method comprising:

detecting an oxygen concentration of the exhaust gas in the exhaust passage upstream of the filter as a first concentration;

detecting an oxygen concentration of the exhaust gas in the exhaust passage downstream of the filter as a second concentration;

determining that a regeneration of the filter has substantially begun when the difference between an excess air factor corresponding to the first concentration and an excess air factor corresponding to the second concentration is not less than a predetermined value;

determining that the regeneration of the filter has substantially ended when the difference falls below the predetermined value; and determining whether or not the oxidation catalyst has deteriorated in relation to a substantial regeneration period from the beginning of the substantial regeneration of the filter to the end of the substantial regeneration of the filter.

* * * * *